US011637471B2

(12) United States Patent
Lin et al.

(10) Patent No.: US 11,637,471 B2
(45) Date of Patent: Apr. 25, 2023

(54) ROTARY ELECTRIC MACHINE AND ASSEMBLING METHOD THEREOF

(71) Applicant: Delta Electronics, Inc., Taoyuan (TW)

(72) Inventors: Shiun-Yi Lin, Taoyuan (TW); Ken-Yao Chuang, Taoyuan (TW); Chien-Da Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 51 days.

(21) Appl. No.: 17/379,764

(22) Filed: Jul. 19, 2021

(65) Prior Publication Data

US 2022/0247250 A1    Aug. 4, 2022

(30) Foreign Application Priority Data

Feb. 2, 2021    (CN) .......................... 202120298644.9

(51) Int. Cl.
*H02K 3/52*    (2006.01)
*H02K 7/08*    (2006.01)
*H02K 15/00*    (2006.01)

(52) U.S. Cl.
CPC ............ *H02K 3/522* (2013.01); *H02K 7/085* (2013.01); *H02K 15/0062* (2013.01); *H02K 2203/03* (2013.01); *H02K 2203/15* (2013.01)

(58) Field of Classification Search
CPC .... H02K 7/085; H02K 11/33; H02K 15/0062; H02K 3/522; H02K 5/22; H02K 15/00; H02K 17/30; H02K 15/14; H02K 3/04
See application file for complete search history.

(56) References Cited

U.S. PATENT DOCUMENTS

| 7,588,444 B2 * | 9/2009 | Kataoka ................. H02K 11/33 439/76.2 |
| 2019/0165633 A1 * | 5/2019 | Gu .......................... H02K 11/33 |
| 2020/0195097 A1 * | 6/2020 | Kodama .................. H02K 3/50 |

FOREIGN PATENT DOCUMENTS

| CN | 2475214 Y | 1/2002 |
| CN | 201499025 U | 6/2010 |
| CN | 102782995 B | 11/2014 |
| TW | M575216 U | 3/2019 |
| TW | M587851 U | 12/2019 |

\* cited by examiner

*Primary Examiner* — Ahmed Elnakib
*Assistant Examiner* — Leda T Pham
(74) *Attorney, Agent, or Firm* — Kirton McConkie; Evan R. Witt (57) ABSTRACT

The present disclosure provides a rotary electric machine including a housing, a stator, a rotor, an outer cover and a plurality of power cables. The stator is disposed in the housing and includes a stator core, a plurality of windings, a circuit board and a plurality of conductive pillars. The plurality of windings are wound around the stator core. The circuit board is fixed on the top of the stator core. The plurality of conductive pillars are electrically coupled with the circuit board. The rotor includes and an end cover. The end cover is disposed between the outer cover and the housing. The plurality of conductive pillars partially penetrate through a notch of the end cover, respectively. Two ends of each of the plurality of power cables are electrically coupled with the corresponding one of the plurality of conductive pillars and a connector, respectively.

19 Claims, 9 Drawing Sheets

ROTARY ELECTRIC MACHINE AND ASSEMBLING METHOD THEREOF

CROSS-REFERENCE TO RELATED APPLICATION

This application claims priority to China Patent Application No. 202120298644.9 filed on Feb. 2, 2021. The entire contents of the above-mentioned patent application are incorporated herein by reference for all purposes.

FIELD OF THE INVENTION

The present disclosure relates to a rotary electric machine, and more particularly to a rotary electric machine for conducting a power cable assembling operation conveniently. The present disclosure also relates to an assembling method of the rotary electric machine.

BACKGROUND OF THE INVENTION

Rotary electric machines (e.g., motor) are widely used in various fields and applications. Generally speaking, a rotary electric machine includes a stator and a rotor. The stator includes a stator core, a plurality of windings and a circuit board. The stator core has a hollow portion, and the plurality of windings are wound around the stator core. The rotor is disposed in the hollow portion of the stator, and rotates relative to the stator. Currently, the power cables of the rotary electric machine are electrically coupled with the circuit board of the stator directly by manually welding. In the process of assembling the stator and the rotor of the rotary electric machine, one ends of the power cables are directly welded on the circuit board of the stator firstly. After that, the power cables are manually pulled through the corresponding perforations of the end cover of the rotor, and the other ends of the power cables are pulled out by pressing and pulling the wires at the same time manually or mechanically. Finally, the stator and the rotor are assembled together. The rotary electric machine can be electrically coupled with an external power source through the power cables, so that the required electric energy can be provided to the rotary electric machines for operations.

However, in the above-mentioned operation of assembling the stator and the rotor, the power cables have to be manually pulled out of the corresponding perforations of the end cover of the rotor. It is easy to cause the power cables to be scratched or damaged. Under this circumstance, the reliability of the products may be reduced. In addition, since the operator needs to assemble the stator and the rotor and manually perform the wire-drawing operations of the power cables at the same time, the operator's hands are at the risk of crushing or injury.

Therefore, there is a need of providing an improved rotary electric machine and an assembling method thereof to obviate the drawbacks of the prior art.

SUMMARY OF THE INVENTION

It is an object of the present disclosure to provide a rotary electric machine and an assembling method thereof, which facilitates the assembly operation of the power cables, and facilitates the assembly operation of the rotor and the stator, so as to save assembly time, improve the safety of operators, make the interior of stator wireless, and avoid damage of the power cables to enhance the reliability of the product.

It is an object of the present disclosure to provide a rotary electric machine. The rotary electric machine includes a housing, a stator, a rotor, an outer cover and a plurality of power cables. The housing has a first accommodating space. The stator is disposed in the first accommodating space, and includes a stator core, a plurality of windings, a circuit board and a plurality of conductive pillars. The stator core has a hollow portion. The plurality of windings are wound around the stator core. The circuit board is fixed on the top of the stator core. The plurality of conductive pillars are respectively electrically coupled with the circuit board and disposed on a first surface of the circuit board. The rotor includes a shaft and an end cover. The shaft is disposed in the hollow portion of the stator and is driven to rotate by the stator. The end cover is fixed on the top of the housing and has a notch. The position of the notch corresponds to the plurality of conductive pillars, and the plurality of conductive pillars partially penetrate through the notch, respectively. The outer cover is connected to the end cover, and the end cover is disposed between the outer cover and the housing. The outer cover includes a second accommodating space and a connector. The plurality of power cables are disposed in the second accommodating space. Two ends of each of the plurality of power cables are electrically coupled with the corresponding one of the plurality of conductive pillars and the connector, respectively.

It is another object of the present disclosure to provide an assembling method of a rotary electric machine. The assembling method includes steps of: (a) providing a housing, a stator, a rotor and a plurality of power cables, wherein the housing has a first accommodating space, the stator includes a stator core, a plurality of windings, a circuit board and a plurality of conductive pillars, wherein the stator core has a hollow portion, the plurality of windings are wound around the stator core, the circuit board is fixed on the top of the stator core, and the plurality of conductive pillars are electrically coupled with the circuit board and disposed on a first surface of the circuit board, respectively, wherein the rotor includes a shaft and an end cover, and the end cover has a notch; (b) disposing the stator in the first accommodating space of the housing; (c) disposing the shaft of the rotor in the hollow portion of the stator, fixing the end cover of the rotor on the top of the housing, and making the plurality of conductive pillars of the rotor to partially penetrate through the notch; and (d) electrically coupling the plurality of power cables with the corresponding one of the plurality of conductive pillars, respectively.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
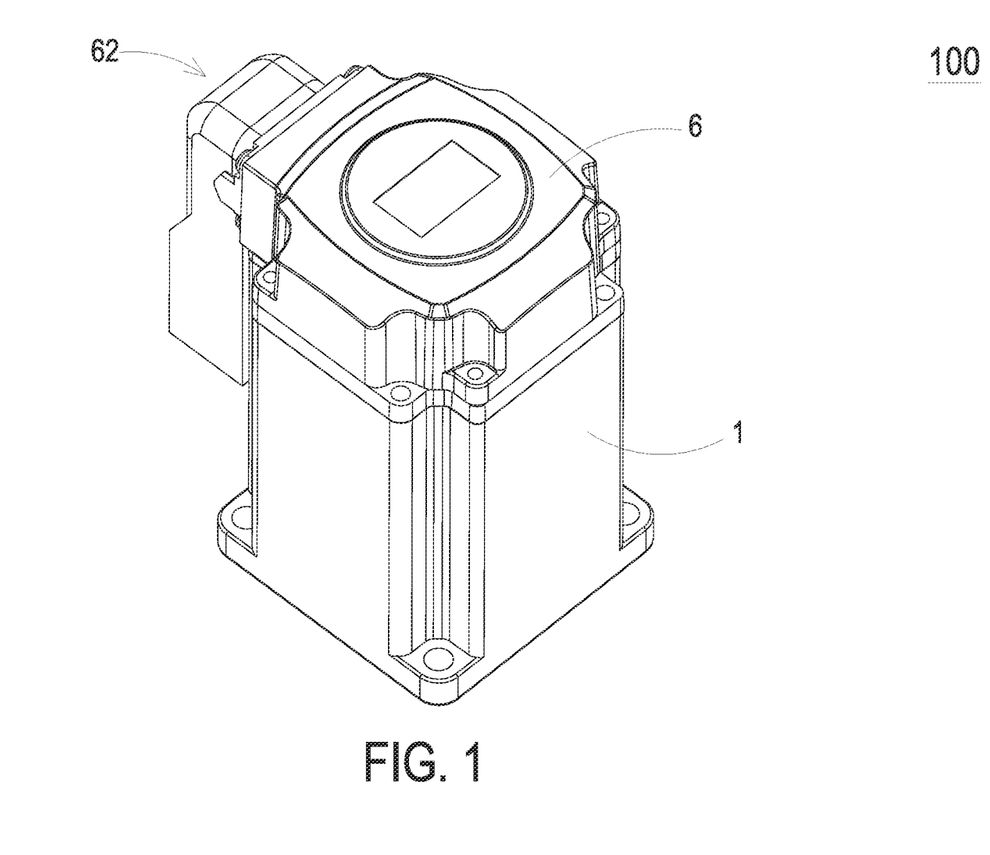
FIG. 1 is a schematic perspective view illustrating a rotary electric machine according to an embodiment of the present disclosure.
Figure 2:
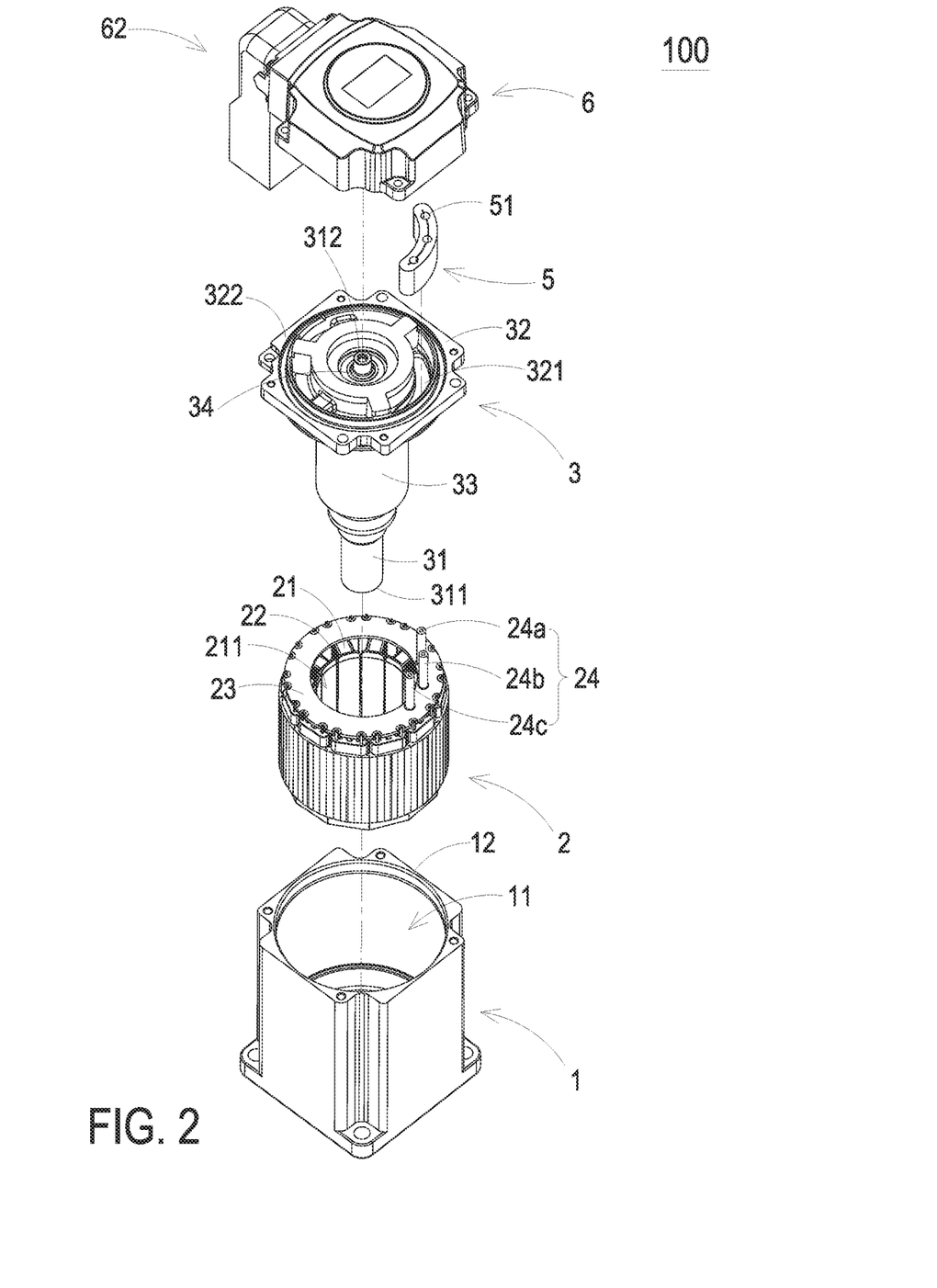
FIG. 2 is a schematic exploded view illustrating the rotary electric machine of FIG. 1.
Figure 3:
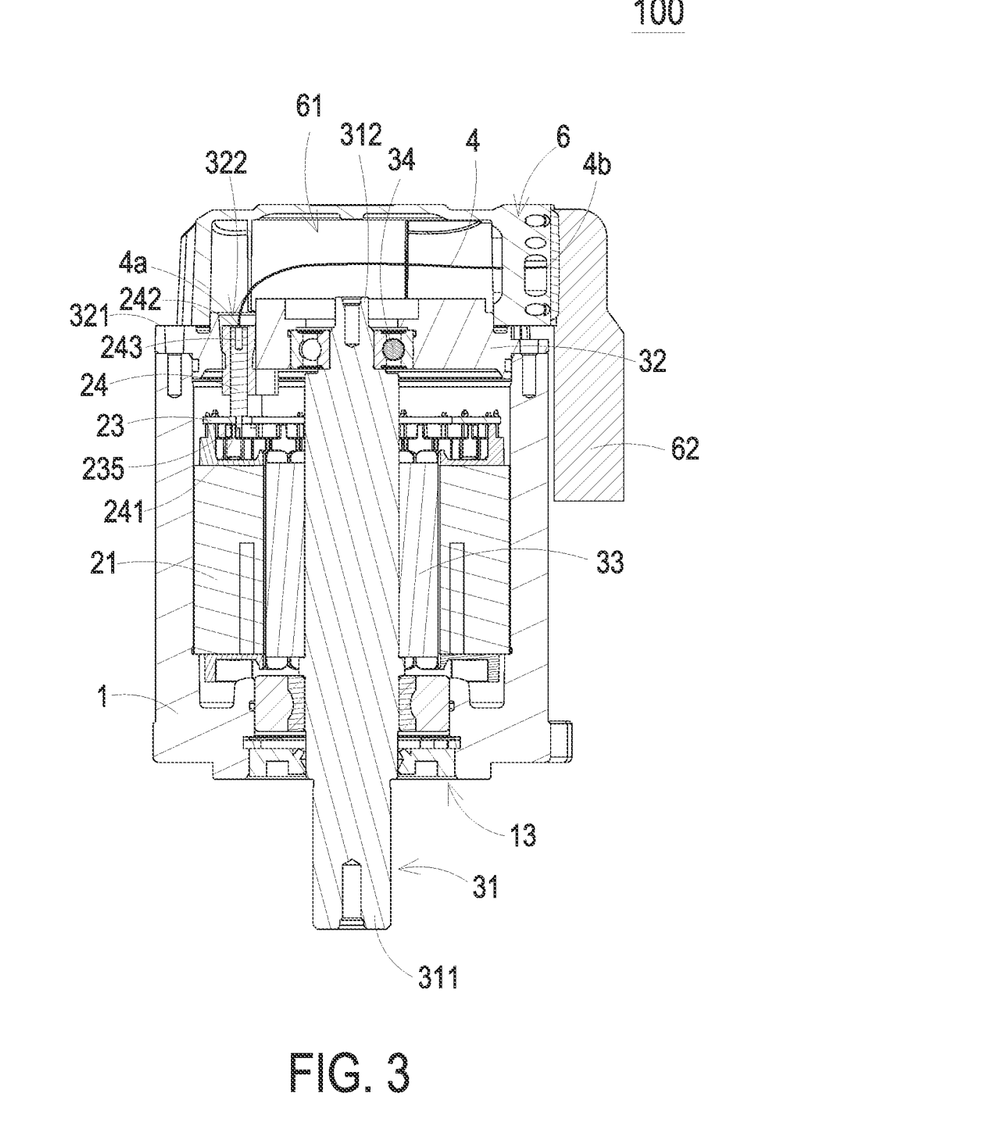
FIG. 3 is a schematic cross-sectional view illustrating the rotary electric machine of FIG. 1.
Figure 4:
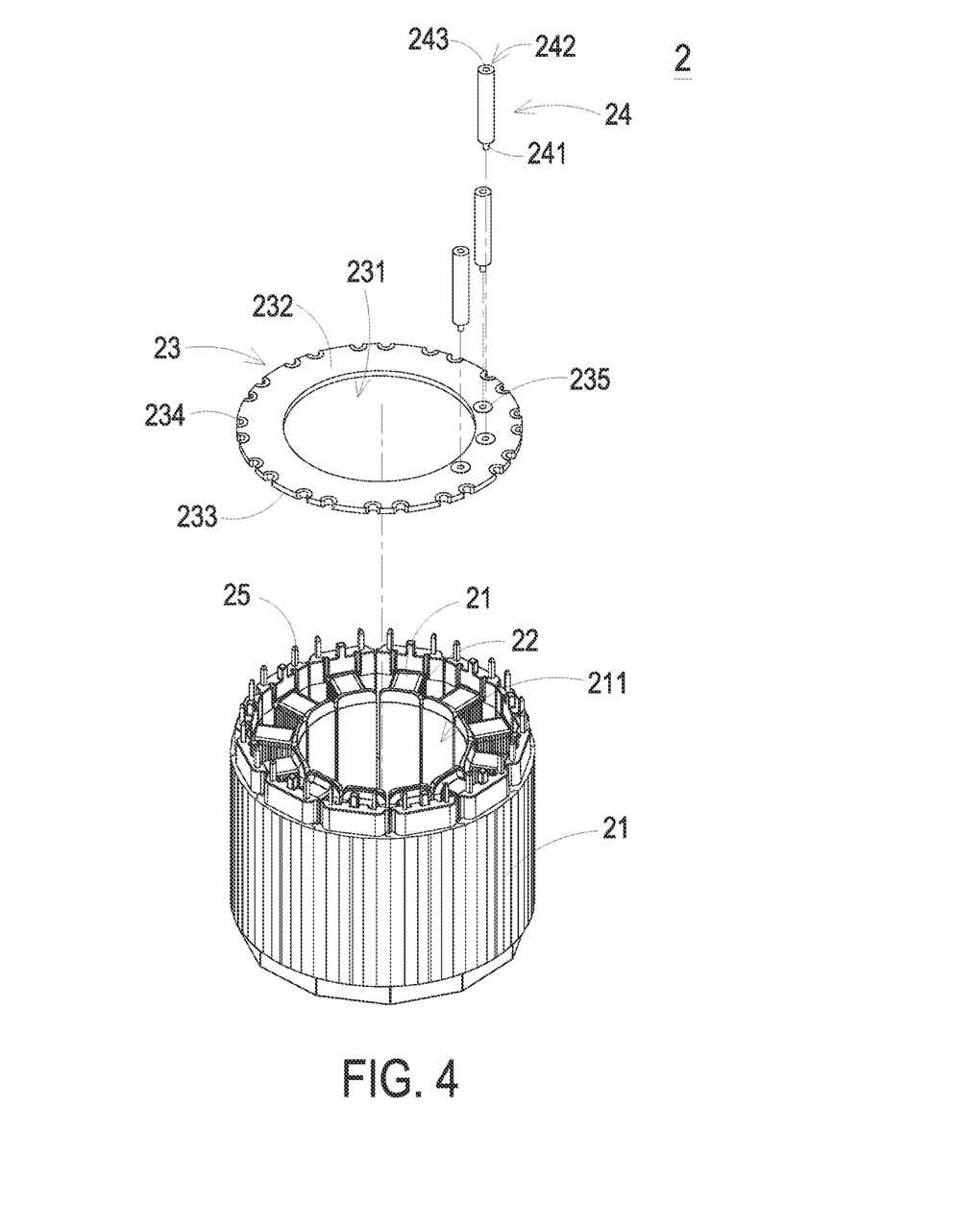
FIG. 4 is a schematic exploded view illustrating a stator of the rotary electric machine of FIG. 1.

Please refer to FIGS. 1 to 4. FIG. 1 is a schematic perspective view illustrating a rotary electric machine according to an embodiment of the present disclosure, FIG. 2 is a schematic exploded view illustrating the rotary electric machine of FIG. 1, FIG. 3 is a schematic cross-sectional view illustrating the rotary electric machine of FIG. 1, and FIG. 4 is a schematic exploded view illustrating a stator of the rotary electric machine of FIG. 1. In this embodiment, the rotary electric machine 100 is a motor, and includes a housing 1, a stator 2, a rotor 3 and a plurality of power cables 4. The housing 1 has a first accommodating space 11. The stator 2 is disposed in the first accommodating space 11 of the stator 1, and includes a stator core 21, a plurality of windings 22, a circuit board 23 and a plurality of conductive pillars 24. The stator core 21 has a hollow portion 211, and the plurality of windings 22 are wound around the stator core 21. The circuit board 23 is fixed on the top of the stator core 21. The plurality of conductive pillars 24 are electrically coupled with the circuit board 23 and disposed on a first surface 232 of the circuit board 23, respectively. The rotor 3 includes a shaft 31 and an end cover 32. The shaft 31 is disposed in the hollow portion 211 of the stator 2, and is driven to rotate by the stator 2. The end cover 32 is fixed on the top of the housing 1, and the end cover 32 has a notch 321. The position of the notch 321 corresponds to the plurality of conductive pillars 24 of the stator 2, and the plurality of conductive pillars 24 partially penetrate through the notch 321, respectively. The plurality of power cables 4 are electrically coupled with the corresponding one of the plurality of conductive pillars 24, respectively.

In this embodiment, the housing 1 has a first opening 12 and a second opening 13. The first accommodating space 11 is in communication with the first opening 12 and the second opening 13, and the first opening 12 and the second opening 13 are located at two opposite sides of the housing 1. In an embodiment, the end cover 32 of the rotor 3 covers the first opening 12, and the shaft 31 of the rotor 3 is partially protruded outwardly from the second opening 13.

In this embodiment, the stator 2 is fixed in the first accommodating space 11 of the housing 1. The stator core 21 includes a plurality of pins 25 disposed on the top of the stator core 21. The plurality of windings 22 are wound around the stator core 21, respectively, and one end of each of the plurality of windings 22 is electrically coupled with the corresponding one of the plurality of pins 25. The circuit board 23 is fixed on the top of the stator core 21, and has a central perforation 231, a first surface 232 and a second surface 233. The position of the central perforation 231 corresponds to the hollow portion 211 of the stator core 21. The first surface 232 is opposed to the second surface 233. The plurality of the conductive pillars 24 are disposed on the first surface 232 of the circuit board 23. The second surface 233 of the circuit board 23 is disposed adjacent to the top of the stator core 21. In an embodiment, the circuit board 23 is fixed on the top of the stator core 21 by a welding process, but not limited thereto. In an embodiment, the circuit board 23 has a plurality of conductive perforations 234. The plurality of conductive perforations 234 penetrate through the first surface 232 and the second surface 233 of the circuit board 23, respectively, and are disposed corresponding to the plurality of the pins 25 of the stator core 21, respectively. While the circuit board 23 is fixed on the top of the stator core 21, the plurality of the pins 25 are plugged into and electrically coupled with the corresponding one of the conductive perforations 234, respectively, so that the circuit board 23 is electrically coupled with the plurality of windings 22. In an embodiment, the circuit board 23 has a plurality of conducting holes 235 formed on the first surface 232 and disposed along the periphery of the central perforation 231. The plurality of conducting holes 235 are electrically coupled with the plurality of conductive perforations 234 by the layout wiring of the circuit board 23 (not shown). In an embodiment, the quantity of the conducting holes 235 is equal to the quantity of the conductive pillars 24.

In this embodiment, the plurality of conductive pillars 24 include a first conductive pillar 24a, a second conductive pillar 24b and a third conductive pillar 24c. It should be emphasized that the quantity of the conductive pillars 24 is not limited to this embodiment and is adjustable according to practical requirements. Each of the conductive pillars 24 has a first end 241 and a second end 242, and the first ends 241 of the plurality of the conductive pillars 24 are plugged into and electrically coupled with the corresponding one of the plurality of conducting holes 235 of the circuit board 23, respectively, so that the plurality of conductive pillars 24 are electrically coupled with the circuit board 23. The plurality of conductive pillars 24 are connected to the plurality of conducting holes 235 of the circuit board 23 by electric welding. Since the plurality of the conductive pillars 24 are plugged into and connected with the corresponding one of the plurality of conducting holes 235, respectively, the plurality of the conductive pillars 24 is positioned rapidly and accurately. Consequently, the advantages of simplifying the manufacturing process and saving assembly time are achieved. In this embodiment, the second end 242 of each of the plurality of the conductive pillars 24 has a recess 243. The recess 243 is concavely formed in the conductive pillar 24 along the direction from the second end 242 toward the first end 241. The plurality of power cables 4 are connected with the corresponding one of the recesses 243 of the plurality of conductive pillars 24, so that the plurality of power cables 4 is positioned rapidly and accurately. Consequently, the advantages of simplifying the manufacturing process and saving assembly time are achieved. In an embodiment, the recess 243 of each of the plurality of conductive pillars 24 penetrates through the first end 241 and the second end 242. That is, each of the plurality of conductive pillars 24 is a hollow tubular structure, but not limited thereto. In an embodiment, the plurality of conductive pillars 24 are disposed along the periphery of the central perforation 231 of the circuit board 23. The positions of the plurality of conductive pillars 24 correspond to the notch 321 of the end cover 32 of the rotor 3, and the plurality of conductive pillars 24 partially penetrate through the notch 321, respectively. The second end 242 of each of the plurality of conductive pillars 24 is protruded outwardly from the notch 321 and is coplanar with a top surface 322 of the end cover 32, but not limited thereto. Since the second ends 242 of the plurality of conductive pillars 24 are coplanar with the top surface 322 of the end cover 32 of the rotor 3, after the stator 2 and the rotor 3 are assembled, the visibility of the plurality of conductive pillars 24 are enhanced, and the power cables 4 can be directly welded to the corresponding one of the plurality of conductive pillars 24. Consequently, the advantages of simplifying the manufacturing process, saving assembly time, making the interior of stator 2 wireless and enhancing the safety of the operators are achieved. It has to be emphasized that the positions of the second ends 242 of the plurality of the conductive pillars 24 relative to the top surface 322 of the end cover 32 of the rotor 3 is not limited to the foregoing embodiment, and it is adjustable according to the practical requirements. For example, the second ends 242 of the plurality of conductive pillars 24 are located at a level higher than or slightly lower than that of the top surface 322 of the end cover 32 of the rotor 3. In an embodiment, the plurality of conductive pillars 24 are made of copper material, and the surfaces of the plurality of conductive pillars 24 are electroplated with tin material, but not limited thereto. In an embodiment, the plurality of conductive pillars 24 are disposed perpendicular to the first surface 232 of the circuit board 23, respectively.

In this embodiment, the rotor 3 includes a magnetic element 33 and a bearing 34. The magnetic element 33 is disposed around the periphery of the shaft 31. The bearing 34 is fixed in an opening of the end cover 32, and the shaft 31 is rotatably pivotally connected to the end cover 32 by the bearing 34. The shaft 31 has a first end 311 and a second end 312. The first end 311 is a free end. The second end 312 is connected with the end cover 32 by the bearing 34, so that the shaft 31 is rotated relative to the cover 32. The shaft 31 of the rotor 3 is disposed in the hollow portion 211 of the stator 2, and the first end 311 of the shaft 31 is protruded outwardly from the housing 1 through the second opening 13 of the housing 1. The end cover 32 is assembled on the top of the housing 1, and the end cover 32 is fixed on the housing 1 to cover the first opening 12 of the housing 1. In this embodiment, the method of assembling the end cover 32 and the housing 1 is realized by screw locking, but not limited thereto.

In this embodiment, the quantity of the plurality of the power cables 4 is equal to the quantity of the plurality of the conductive pillars 24. In an embodiment, the plurality of the power cables 4 include a first power cable 41, a second power cable 42 and a third power cable 43. It should be emphasized that the quantity of the power cables 4 is not limited to this embodiment, and is adjustable according to the practical requirements. Each of the plurality of power cables 4 has a first end 4a and a second end 4b. Each of the first ends 4a of the plurality of the power cables 4 are connected with the corresponding one of the second ends 242 of the plurality of the conductive pillars 24, respectively. Preferably but not exclusively, the connections between the first ends 4a of the power cables 4 and the second ends 242 of the conductive pillars 24 are performed by welding. In an embodiment, the rotary electric machine 100 is a three phase rotary electric machine. The voltage with the first phase is applied to the first power cable 41, the voltage with the second phase is applied to the second power cable 42, and the voltage with the third phase is applied to the third power cable 43. The first power cable 41 is a live wire, the second power cable 42 is a neutral wire, and the third power cable 43 is a earth wire, but not limited thereto.

In an embodiment, the rotary electric machine 100 includes an insulating component 5. The insulating component 5 is partially disposed in the notch 321 of the end cover 32, and has a plurality of perforations 51. The plurality of perforations 51 are disposed corresponding to the plurality of conductive pillars 24, respectively. The plurality of conductive pillars 24 penetrate through the corresponding one of the plurality of perforations 51, respectively, and each of the second ends 242 of the plurality of the conductive pillars 24 is slightly and outwardly protruded from the top surface of the insulating component 5. With the arrangement of the insulating component 5, the plurality of conductive pillars 24 are insulated from the components disposed around the peripheral, and the electrical safety is improved. In an embodiment, the quantity of the plurality of perforations 51 of the insulating component 5 is equal to the quantity of the plurality of power cables 4 and the quantity of the plurality of conductive pillars 24, but not limited thereto. In this embodiment, the insulating component 5 is configured to close the notch 321 of the end cover 32 of the rotor 3. By using the insulating component 5 to close the notch 321, the advantages of dustproof, waterproof and insulation are achieved. In this embodiment, the insulating component 5 is made of a rubber material, but not limited thereto.

In an embodiment, the rotary electric machine 100 includes an outer cover 6. The outer cover 6 is connected to the end cover 32, and the outer cover 6 is fixed on the housing 1. That is, the end cover 32 of the rotor 3 is disposed between the outer cover 6 and the housing 1. The outer cover 6 has a second accommodating space 61 and a connector 62. A part of each of the plurality of the power cables 4 is located in the second accommodating space 61. Each of the second ends 4b of the plurality of the power cables 4 is electrically coupled with the connector 62. While the connector 62 is electrically coupled with an external power source (not shown), the required electric energy is provided to the rotary electric machine 100 for operations through the power cables 4. In addition, the outer cover 6 covers the end cover 32 of the rotor 3 completely, so that the interference caused by external objects is avoided.

In an embodiment, the rotary electric machine 100 includes an encapsulation layer (not shown) formed on the first surface 232 of the circuit board 23 of the stator 2 to provide functions of waterproof and dustproof for the circuit board 23.

Figure 5:
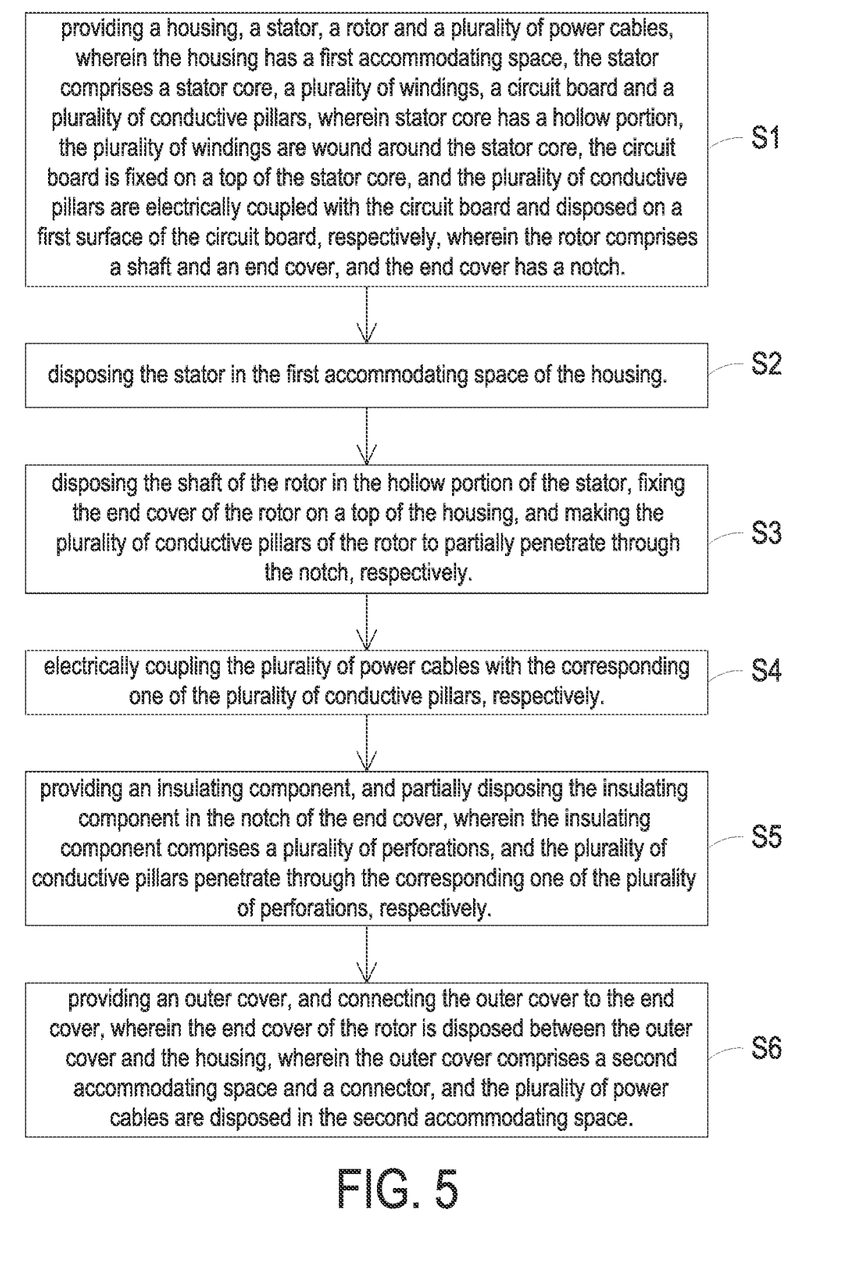
FIG. 5 is a flow chart showing an assembling method of a rotary electric machine according to an embodiment of the present disclosure.
Figure 6A:
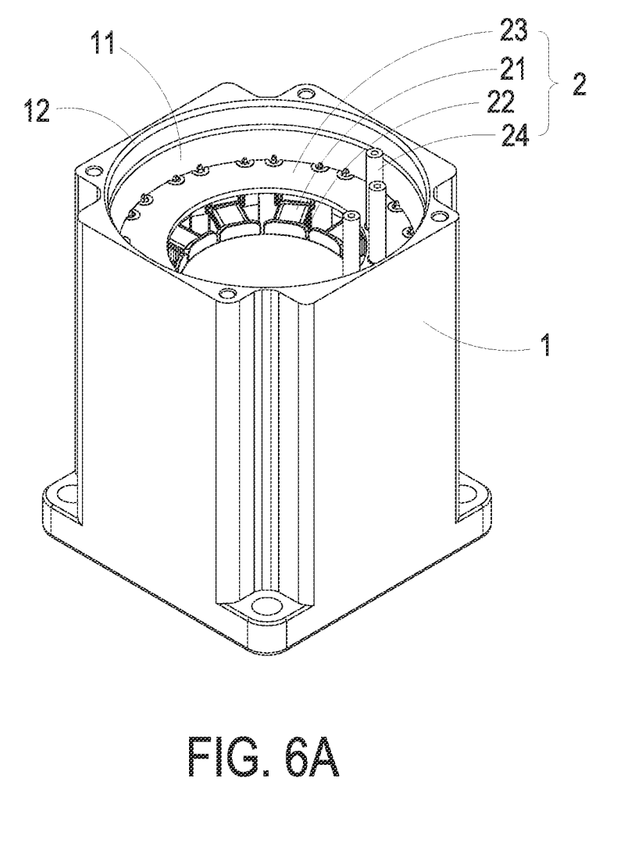
FIG. 6A is a schematic perspective assembly view illustrating the assembly of the stator and the rotor of the rotary electric machine of FIG. 1.
Figure 6B:
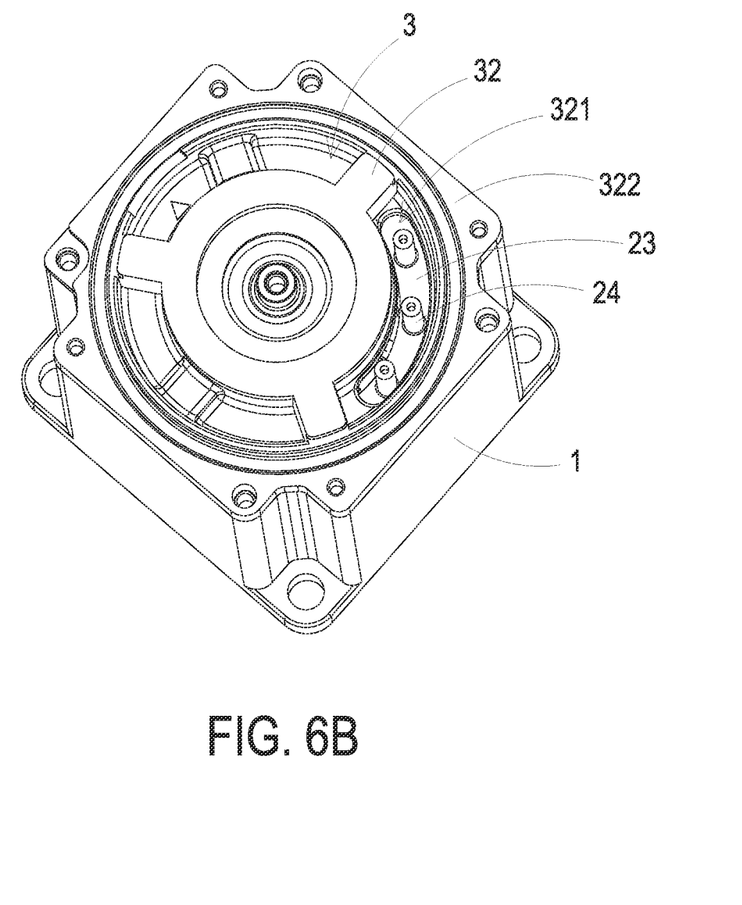
FIG. 6B is a schematic perspective assembly view illustrating the assembly of the housing, the stator and the rotor of the rotary electric machine of FIG. 1.
Figure 6C:
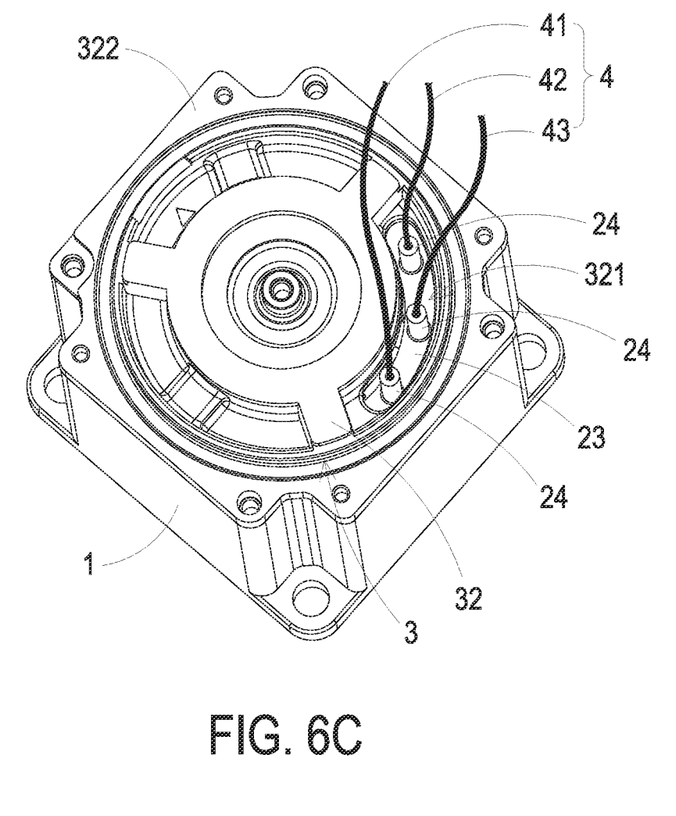
FIG. 6C is a schematic perspective assembly view illustrating the assembly of the housing, the stator, the rotor and the power cables of the rotary electric machine of FIG. 1.
Figure 6D:
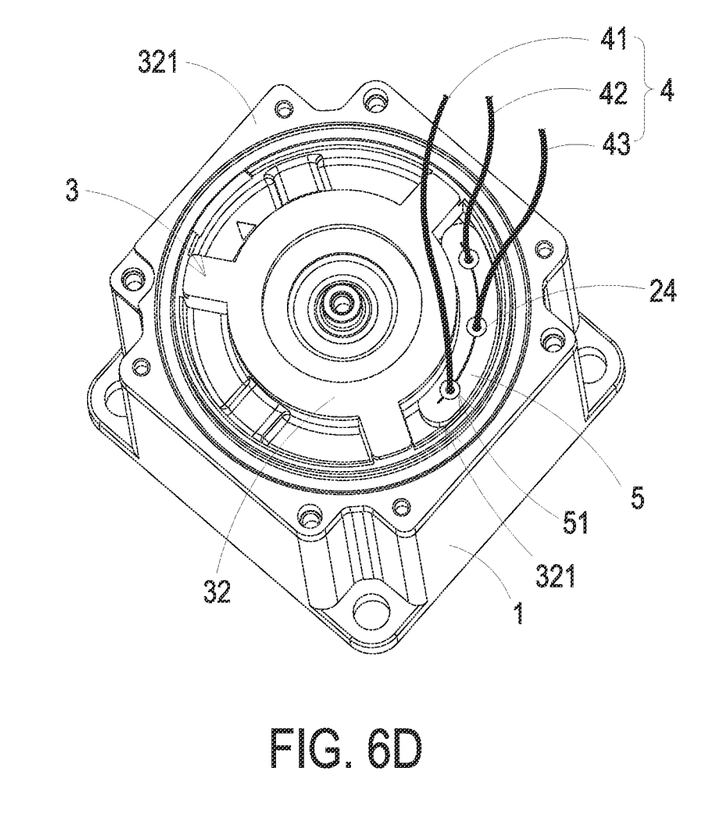
FIG. 6D is a schematic perspective assembly view illustrating the assembly of the housing, the stator, the rotor, the power cables and the insulating component of the rotary electric machine of FIG. 1.

Please refer to FIGS. 1, 2, 5 and 6A to 6D. FIG. 5 is a flow chart showing an assembling method of a rotary electric machine according to an embodiment of the present disclosure, FIG. 6A is a schematic perspective assembly view illustrating the assembly of the stator and the rotor of the rotary electric machine of FIG. 1, FIG. 6B is a schematic perspective assembly view illustrating the assembly of the housing, the stator and the rotor of the rotary electric machine of FIG. 1, FIG. 6C is a schematic perspective assembly view illustrating the assembly of the housing, the stator, the rotor and the power cables of the rotary electric machine of FIG. 1, and FIG. 6D is a schematic perspective assembly view illustrating the assembly of the housing, the stator, the rotor, the power cables and the insulating component of the rotary electric machine of FIG. 1. In this embodiment, the assembling method of a rotary electric machine 100 includes the following steps. Firstly, in a step S1, a housing 1, a stator 2, a rotor 3 and a plurality of power cables 4 are provided. The housing 1 has a first accommodating space 11. The stator 2 is disposed in the first accommodating space 11 of the stator 1, and includes a stator core 21, a plurality of windings 22, a circuit board 23 and a plurality of conductive pillars 24. The stator core 21 has a hollow portion 211. The plurality of windings 22 are wound around the stator core 21. The circuit board 23 is fixed on the top of the stator core 21. The plurality of conductive pillars 24 are electrically coupled with the circuit board 23, and disposed on a first surface 232 of the circuit board 23, respectively. The rotor 3 includes a shaft 31 and an end cover 32. The cover 32 has a notch 321. In an embodiment, the step S1 includes the following sub-steps sequentially. Firstly, the second surface 233 of the circuit board 23 is disposed adjacent to the top of the stator core 21, the circuit board 23 is electrically connected with the plurality of windings 22, and the circuit board 23 is fixed on the top of the stator core 21. Then, the plurality of conductive pillars 24 are electrically coupling with the circuit board 23 and disposed on the first surface 232 of the circuit board 23.

Then, in a step S2, the stator 2 is disposed in the first accommodating space 11 of the stator 1, as shown in FIG. 6A. Thereafter, in a step S3, the shaft 31 of the rotor 3 is disposed in the hollow portion 211 of the stator 2, the end cover 32 of the rotor 3 is fixed on the top of the housing 1, and the plurality of conductive pillars 24 of the stator 2 partially penetrate through the notch 321, respectively. Each of the second ends 242 of the plurality of conductive pillars 24 is protruded outwardly from the notch 321, as shown in FIG. 6B. Finally, in a step S4, the plurality of power cables 4 are electrically coupled with the corresponding one of the plurality of conductive pillars 24, respectively, as shown in FIG. 6C.

Please refer to FIGS. 5 and 6A to 6D again. In an embodiment, the assembling method of the rotary electric machine 100 includes a step S5 after the step S4 is performed. In the step S5, an insulating component 5 is provided. The insulating component 5 is partially disposed in the notch 321 of the end cover 32. The insulating component 5 includes a plurality of perforations 51. The plurality of conductive pillars 24 penetrate through the corresponding one of the plurality of perforations 51, respectively. In an embodiment, when the insulating component 5 is disposed in the notch 321 of the cover 32, firstly the plurality of the power cables 4 penetrate through the corresponding one of the plurality of perforations 51 of the insulating component 5, respectively. Then, the insulating component 5 is pushed to slide and approach to the plurality of conductive pillars 24. Thereafter, the plurality of perforations 51 of the insulating component 5 are in fitted with the corresponding one of the plurality of conductive pillars 24. Finally, the insulating component 5 is tightly fixed in the notch 321, so that the insulating component 5 is disposed in the end cover 32, as shown in the FIG. 6D. It should be emphasized that the method of assembling the insulating component 5 is not limited to the foregoing embodiment, and is adjustable according to the practical requirements. In another embodiment, firstly the plurality of perforations 51 of the insulating component 5 are in fitted with the corresponding one of the plurality of conductive pillars 24. Then, the insulating component 5 is tightly fixed in the notch 321 of the end cover 32. Thereafter, the plurality of the power cables 4 are electrically coupled with the corresponding one of the plurality of the conductive pillars 24, respectively.

Please refer to FIGS. 1, 5 and 6D again. In an embodiment, the assembling method of the rotary electric machine 100 includes a step S6 after the step S5 is performed. In the step S6, an outer cover 6 is provided. The outer cover 6 is connected to the end cover 32, so that the end cover 32 of the rotor 3 is disposed between the outer cover 6 and the housing 1, as shown in FIG. 1.

In summary, the present disclosure provides a rotary electric machine, which facilitates the assembly operation of the power cables, and facilitates the assembly operation of the rotor and the stator, so as to save assembly time, improve the safety of operators, make the interior of stator wireless, and avoid damage of the power cables to enhance the reliability of the product.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotary electric machine, comprising:
a housing having a first accommodating space;
a stator disposed in the first accommodating space, and comprising a stator core, a plurality of windings, a circuit board and a plurality of conductive pillars, wherein the stator core has a hollow portion, the plurality of windings are wound around the stator core, the circuit board is fixed on a top of the stator core, and the plurality of conductive pillars are electrically coupled with the circuit board and disposed on a first surface of the circuit board, respectively;
a rotor comprising a shaft and an end cover, wherein the shaft is disposed in the hollow portion of the stator and is driven to rotate by the stator, the end cover is fixed on a top of the housing, and the end cover has a notch, wherein a position of the notch corresponds to the plurality of conductive pillars, and the plurality of conductive pillars partially penetrate through the notch, respectively;
an outer cover connected to the end cover, wherein the end cover is disposed between the outer cover and the housing, and the outer cover comprises a second accommodating space and a connector; and
a plurality of power cables disposed in the second accommodating space, wherein two ends of each of the plurality of power cables are electrically coupled with a corresponding one of the plurality of conductive pillars and the connector, respectively.

2. The rotary electric machine according to claim 1, wherein the housing has a first opening and a second opening, wherein the first accommodating space is in communication with the first opening and the second opening, and the first opening and the second opening are located at two opposite sides of the housing, wherein the end cover covers the first opening, and the shaft is partially protruded outwardly from the second opening.

3. The rotary electric machine according to claim 1, wherein the rotor comprises a magnetic element and a bearing, wherein the magnetic element is disposed around a periphery of the shaft, the bearing is disposed on the end cover, and the shaft is rotatably pivotally connected to the end cover by the bearing.

4. The rotary electric machine according to claim 1, wherein the circuit board has a central perforation, a second surface and a plurality of conducting holes, wherein the position of the central perforation corresponds to the hollow portion of the stator core, the first surface is opposed to the second surface, the second surface is adjacent to the top of the stator core, and the plurality of conducting holes are formed on the first surface of the circuit board.

5. The rotary electric machine according to claim 4, wherein the stator core comprises a plurality of pins disposed on the top of the stator core, wherein one end of each of the plurality of windings is coupled with a corresponding one of the plurality of pins, wherein the circuit board has a plurality of conductive perforations penetrating through the first surface and the second surface respectively, and the plurality of conducting holes are electrically coupled with the plurality of conductive perforations, wherein the plurality of the pins are plugged into and electrically coupled with a corresponding one of the conductive perforations of the circuit board, respectively.

6. The rotary electric machine according to claim 5, wherein the plurality of conductive pillars are connected to the plurality of conducting holes of the circuit board by electric welding.

7. The rotary electric machine according to claim 4, wherein each of the conductive pillars has a first end, and first ends of the plurality of the conductive pillars are electrically coupled with a corresponding one of the plurality of conducting holes of the circuit board, respectively.

8. The rotary electric machine according to claim 1, wherein each of the plurality of conductive pillars has a second end, and second ends of the plurality of conductive pillars are coplanar with a top surface of the end cover.

9. The rotary electric machine according to claim 8, wherein the second end of each of the plurality of the conductive pillars has a recess.

10. The rotary electric machine according to claim 1, wherein each of the plurality of conductive pillars is a hollow tubular structure.

11. The rotary electric machine according to claim 1, wherein the plurality of the power cables comprise a first power cable, a second power cable and a third power cable, wherein the first power cable is a live wire, the second power cable is a neutral wire, and the third power cable is an earth wire.

12. The rotary electric machine according to claim 1, further comprising an insulating component, wherein the insulating component is partially disposed in the notch of the end cover, and has a plurality of perforations, wherein the plurality of conductive pillars penetrate through a corresponding one of the plurality of perforations, respectively.

13. The rotary electric machine according to claim 1, further comprising an encapsulation layer formed on the first surface of the circuit board.

14. The rotary electric machine according to claim 1, wherein the plurality of conductive pillars are disposed perpendicular to the first surface of the circuit board, respectively.

15. An assembling method of a rotary electric machine, the assembling method comprising:
(a) providing a housing, a stator, a rotor and a plurality of power cables, wherein the housing has a first accommodating space, the stator comprises a stator core, a plurality of windings, a circuit board and a plurality of conductive pillars, wherein stator core has a hollow portion, the plurality of windings are wound around the stator core, the circuit board is fixed on a top of the stator core, and the plurality of conductive pillars are electrically coupled with the circuit board and disposed on a first surface of the circuit board, respectively, wherein the rotor comprises a shaft and an end cover, and the end cover has a notch;
(b) disposing the stator in the first accommodating space of the housing;
(c) disposing the shaft of the rotor in the hollow portion of the stator, fixing the end cover of the rotor on a top of the housing, and making the plurality of conductive pillars of the rotor to partially penetrate through the notch, respectively; and
(d) electrically coupling the plurality of power cables with a corresponding one of the plurality of conductive pillars, respectively.

16. The assembling method of the rotary electric machine according to claim 15, wherein the step (a) comprises the sub-steps of:
(a1) disposing a second surface of the circuit board adjacent to the top of the stator core, electrically coupling the circuit board with the plurality of windings, and fixing the circuit board on the top of the stator core; and
(a2) electrically coupling the plurality of conductive pillars with the circuit board and disposing the plurality of conductive pillars on the first surface of the circuit board.

17. The assembling method of the rotary electric machine according to claim 15, wherein the step (b) comprises a step of forming an encapsulation layer on the first surface of the circuit board.

18. The assembling method of the rotary electric machine according to claim 15, wherein after the step (d), further comprising a step of (e): providing an insulating component, and partially disposing the insulating component in the notch of the end cover, wherein the insulating component comprises a plurality of perforations, and the plurality of conductive pillars penetrate through a corresponding one of the plurality of perforations, respectively.

19. The assembling method of the rotary electric machine according to claim 15, wherein after the step (d), further comprising a step of (f): providing an outer cover, and connecting the outer cover to the end cover, wherein the end cover of the rotor is disposed between the outer cover and the housing, wherein the outer cover comprises a second accommodating space and a connector, and the plurality of power cables are disposed in the second accommodating space.

* * * * *